United States Patent
Patle et al.

(10) Patent No.: US 11,755,354 B2
(45) Date of Patent: Sep. 12, 2023

(54) NUMA-AWARE RESOURCE ALLOCATION AND PLACEMENT OF DATABASE CONTAINERS

(71) Applicant: SAP SE, Walldorf (DE)

(72) Inventors: Sanket Patle, Pleasanton, CA (US); Ramesh Gaikwad, Sangli (IN); Rajesh Almeida, Pleasanton, CA (US); Rohit Dhangar, Pune (IN)

(73) Assignee: SAP SE, Walldorf (DE)

( * ) Notice: Subject to any disclaimer, the term of this patent is extended or adjusted under 35 U.S.C. 154(b) by 541 days.

(21) Appl. No.: 16/690,002

(22) Filed: Nov. 20, 2019

(65) Prior Publication Data

US 2021/0149703 A1 May 20, 2021

(51) Int. Cl.
*G06F 9/455* (2018.01)
*G06F 9/50* (2006.01)
*G06F 16/188* (2019.01)
*G06F 16/14* (2019.01)
(Continued)

(52) U.S. Cl.
CPC ........ *G06F 9/45558* (2013.01); *G06F 9/5016* (2013.01); *G06F 11/3034* (2013.01); *G06F 12/0246* (2013.01); *G06F 16/148* (2019.01); *G06F 16/188* (2019.01); *G06F 2009/4557* (2013.01); *G06F 2009/45583* (2013.01); *G06F 2212/2542* (2013.01); *G06F 2212/7207* (2013.01)

(58) Field of Classification Search
None
See application file for complete search history.

(56) References Cited

U.S. PATENT DOCUMENTS

| 9,886,313 | B2 | 2/2018 | Wagle et al. | |
|---|---|---|---|---|
| 2016/0085571 | A1* | 3/2016 | Kim | G06F 9/48 718/1 |
| 2018/0307414 | A1* | 10/2018 | Smith | G06F 12/1027 |

(Continued)

OTHER PUBLICATIONS

Blagodurov, S. et al., "A Case for NUMA-aware Contention Management on Multicore Systems," (2011), USENIX11 (15 pages).

(Continued)

*Primary Examiner* — Wynuel S Aquino
(74) *Attorney, Agent, or Firm* — Mintz Levin Cohn Ferris Glovsky and Popeo, P.C.

(57) ABSTRACT

A system including at least one data processor and at least one memory is provided. The at least one memory may store instructions that cause operations when executed by the at least one data processor. The operations may include determining a processing or memory storage threshold of a database system has been satisfied, the database system including a cloud infrastructure, a plurality of virtual machines, and a plurality of containers deployed on the plurality of virtual machines, the database system having a Non-Uniform Memory Access (NUMA) topology. The operations may include requesting provisioning of a virtual machine to the database system. The operations may include obtaining information regarding the NUMA topology and a performance of the database system. The operations may include determining a virtual machine for placement of the container based on the information. The operations may include deploying the container on the determined virtual machine.

15 Claims, 7 Drawing Sheets

(51) Int. Cl.
  *G06F 11/30* (2006.01)
  *G06F 12/02* (2006.01)

(56) References Cited

U.S. PATENT DOCUMENTS

2018/0349168 A1* 12/2018 Ahmed ............... G06F 11/3433
2021/0117220 A1*  4/2021 Zu ........................... G06F 9/50

OTHER PUBLICATIONS

"Managing Compute Resources for Containers." Retrieved from https://kubernetes.io/docs/concepts/configuration/manage-compute-resources-container/.
Rostykus, B. et al., "Predictive CPU isolation of containers at Netflix," Jun. 4, 2019. Retrieved from https://medium.com/netflix-techblog/predictive-cpu-isolation-of-containers-at-netflix-91f014d856c7.

* cited by examiner

NUMA-AWARE RESOURCE ALLOCATION AND PLACEMENT OF DATABASE CONTAINERS

TECHNICAL FIELD

The subject matter described herein relates generally to restricting scheduling of background processes in a cloud network.

BACKGROUND

A database may be configured to store a plurality of electronic data records. These data records may be organized, in accordance with a database schema, into various database objects including, for example, one or more database tables. The database may be coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for a restricting scheduling of background processes in a cloud network. In one aspect, there is provided a system including at least one data processor and at least one memory. The at least one memory may store instructions that cause operations when executed by the at least one data processor. The operations may include: determining a processing or memory storage threshold of a database system has been satisfied. The database system may include a cloud infrastructure, a plurality of virtual machines (VMs), and a plurality of containers deployed on the plurality of virtual machines, the database system having a non-uniform memory access (NUMA) topology. The operations may include requesting provisioning of a virtual machine to the database system. The operations may include collecting information regarding the NUMA topology and the memory sub-system performance. The operations may include storing metadata that may include the NUMA topology and database resource mapping information. The operations may include receiving a request for services, the request comprising a requirement of a container. The operations may include determining a virtual machine for placement of a database container based on the metadata. The operations may include deploying, and in response to the determining, the container on the determined virtual machine.

In some variations, one or more features disclosed herein including the following features can optionally be included in any feasible combination. The deploying the container may include allocating specific CPU and memory resources to the container. The NUMA topology may include one or more NUMA nodes. The one or more NUMA nodes may include a central processing unit (CPU) core and at least one memory page. Deploying the container may include allocating at least one NUMA node of the one or more NUMA nodes to the container. The operations may further include determining, by the processor and in response to the determining the virtual machine, at least one NUMA node of the one or more NUMA nodes for placement of the container based on the metadata. The information regarding the NUMA topology and the database system performance may include a total number of HANA (e.g., database) cloud units (HCU) per virtual machine. HANA is an example of an in-memory, column-oriented, relational database management system. Each HCU may be mapped to specific CPU cores and a NUMA node. The information regarding the NUMA topology and the database system performance may include a number of containers hosted on the plurality of virtual machines. The information regarding the NUMA topology and the database system performance may include a number of NUMA nodes, CPU core indexes per NUMA node, a memory size per NUMA node, a list of neighbor NUMA nodes, a list of remote NUMA nodes, a memory bandwidth, or the like. The metadata may include NUMA topology, a HANA cloud unit to resource mapping, and a virtual machine usage. The requirement of the container may include a memory size of the container.

In another aspect, there is provided a computer implemented method. The method may include: determining a processing or memory storage threshold of a database system has been satisfied. The database system may include a cloud infrastructure, a plurality of virtual machines, and a plurality of containers deployed on the plurality of virtual machines. The database system having a non-uniform memory access (NUMA) topology. The method may further include requesting provisioning of a virtual machine to the database system. The method may further include collecting information regarding the NUMA topology and the database system performance. The method may further include storing metadata including the NUMA topology and database resource mapping information. The method may further include receiving a request for services, the request comprising a requirement of a container. The method may further include determining a virtual machine for placement of the container based on the metadata. The method may further include deploying, and in response to the determining, the container on the determined virtual machine.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database system may include cloud-based solution which enables an end-user to subscribe to database instances of a required size without the need for setting up the hardware, software installation, configuration and some of the common database process activities such as backup, replication, upgrade, or the like. For example, an end-user can request for the database of size in multiples of computing units (e.g., HANA cloud units equal to 16 GB) with sizes varying from 32 GB to 2 TB, for example. Depending on the size of database instances required by the end-user and the size of a virtual machine, the database system may host anywhere between 1-64 database containers, for example, on a virtual machine. Multiple performance issues may arise by hosting multiple database containers on a system.

To illustrate further, thread level contention may occur between the database containers. If the database containers are deployed without any CPU restriction, each container may see that all cores on the machine are available to the database services running inside it. A database server may size thread pools accordingly. When there are more active threads than available hardware contexts, the operating system may need to balance the usage of hardware contexts among a higher number of threads. This may result in a large number of context switches. This over-parallelization may affect performance. Additionally, the database containers may be allocated to memory access nodes without certain controls which may result in multiple performance issues associated with large systems, such as increased remote memory access and latency, cache contention, contention at the memory controller, and the contention at the memory interconnect reducing in reduced overall memory bandwidth.

In order to address these performance issues, the database system may utilize a centralized orchestration component to manage multiple virtual machines, each machine hosting multiple database instances isolated using containers. To get an optimum individual and cumulative performance of these database systems, the orchestration component may dynamically allocate specific CPU and memory resources to the database containers. The orchestration component may be aware of the underlying memory access topology of the virtual machine and exploit an elasticity behavior with respect to CPU and memory sizing in the database system and memory access awareness in the database system to more efficiently allocate resources and increase processing speeds.

Figure 1:
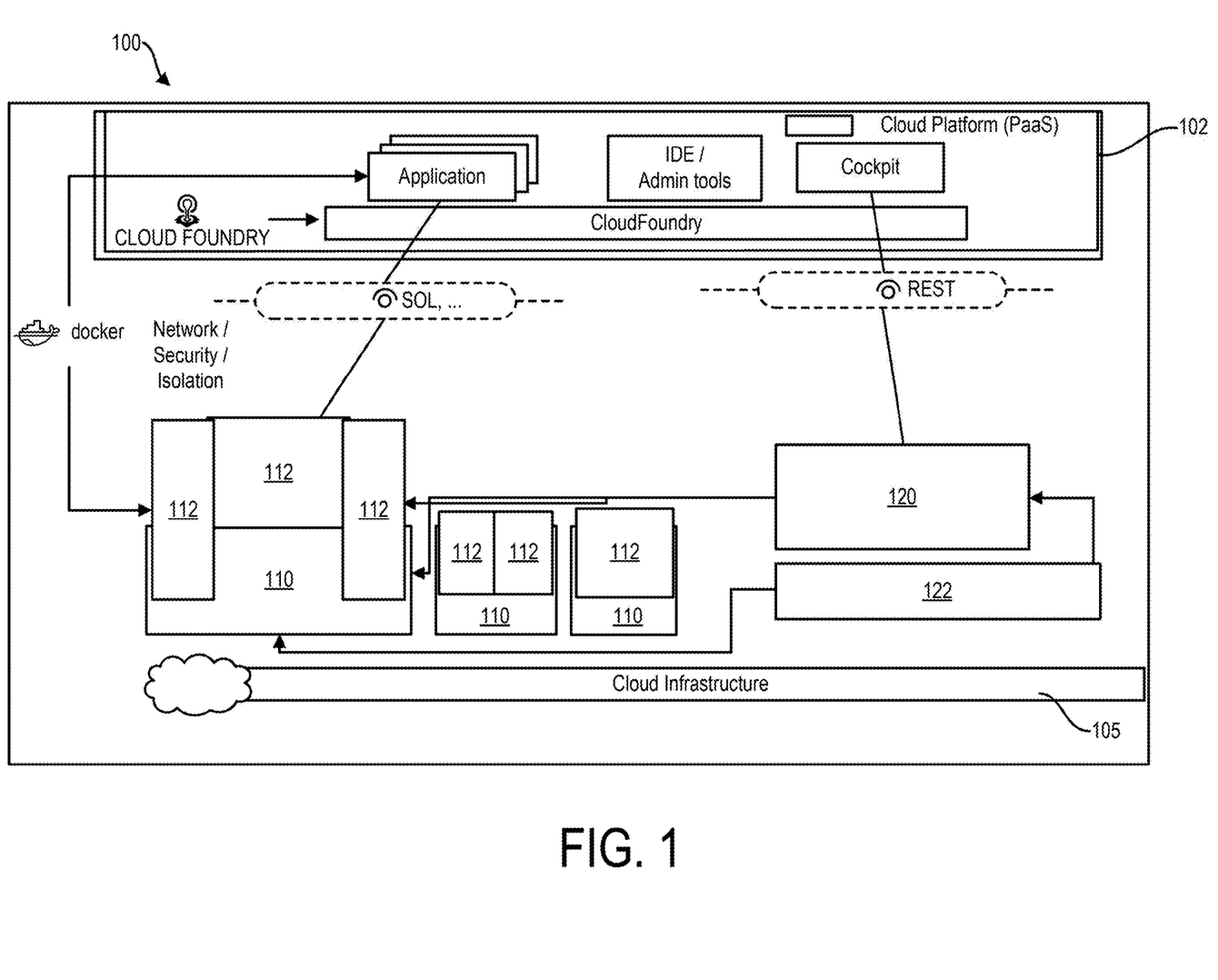
FIG. 1 depicts a system diagram illustrating a cloud based database service.

FIG. 1 depicts a system diagram illustrating a database system 100, in accordance with some example embodiments. Referring to FIG. 1, the database system 100 may include a cloud platform 102, a cloud infrastructure 105, virtual machines (VMs) 110 having containers 112, an orchestration component 120, and a telemetry/metering component 122. Each virtual machine 110 may host more than one database instance requested by the end-user. These database instances may be isolated using operating system-level virtualization using containers 112.

Containers (e.g., containers 112) may provide a way to virtualize an operating system so that multiple workloads can run on a single operating system instance. The containers 112 may provide a way to run isolated virtualized systems on a single server or host operating system (e.g., host VM 110). Examples of containers include docker containers, Linux containers, Windows containers, database containers, or the like The database system 100 may utilize non-uniform memory access (NUMA) in which the CPUs of a computing system may be able to access some memory locations faster than other memory locations. In traditional database systems, each CPU of the system may share a single memory controller. Scaling of these systems using a single memory controller became increasingly difficult as computer systems grew larger in the number of CPU cores and main memory. To solve this limitation, modern systems may be based on NUMA, where memory is partitioned across several processors and each processor can access local memory faster than other remote memory on the system.

The virtual machines 110 may be NUMA-based systems. Some NUMA factors, such as remote memory latency and memory interconnect contention, may degrade the performance for data-intensive software, such as database systems (e.g., database system 100).

Figure 2:
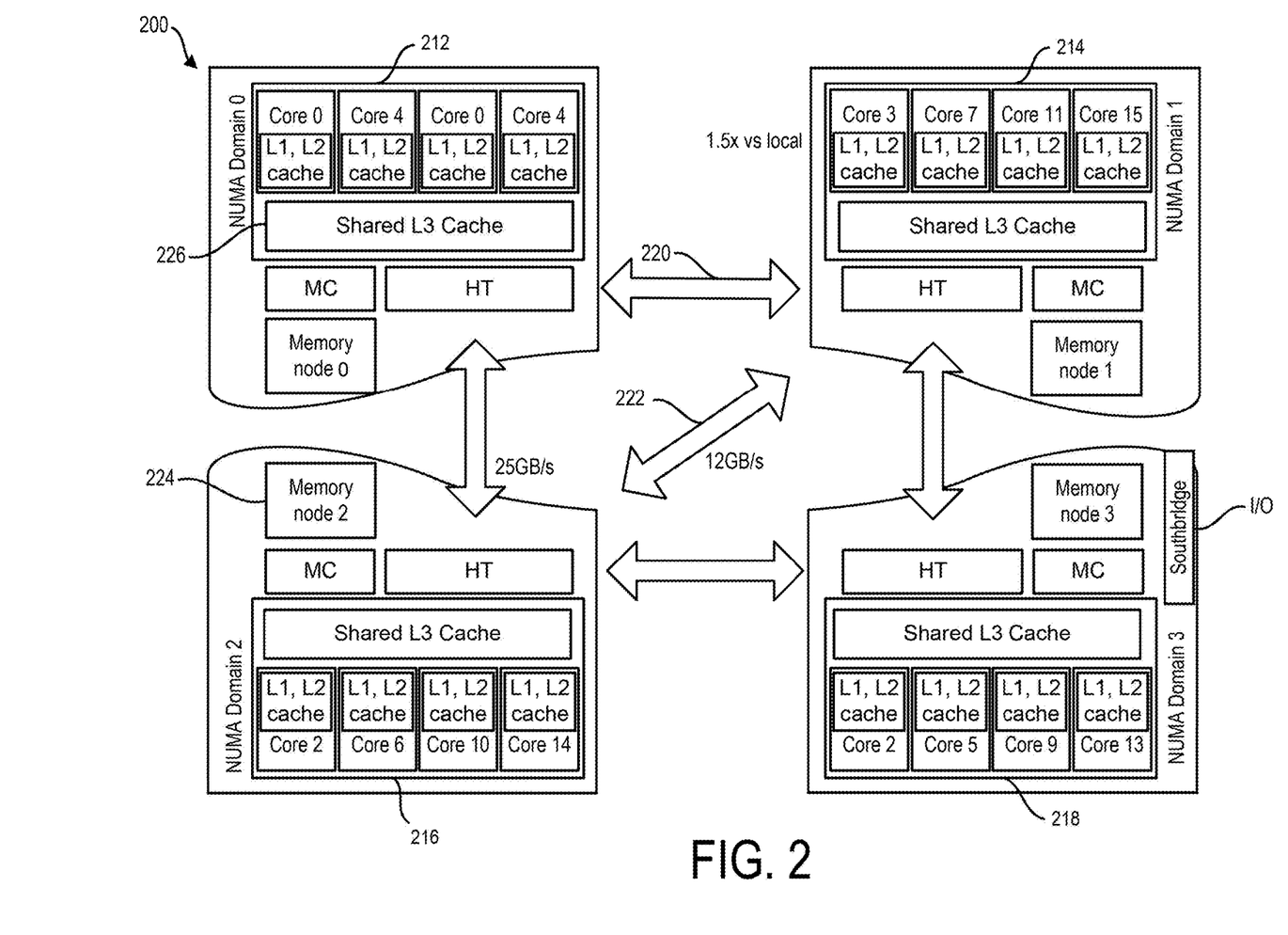
FIG. 2 shows a diagram illustrating an example non-uniform memory access (NUMA) topology, in accordance with some example embodiments.

FIG. 2 depicts a diagram illustrating an example NUMA topology 200 with examples of bottlenecks or factors that may degrade performance. In the example of FIG. 2, the NUMA topology 200 includes four nodes, 212, 214, 216, and 218. As further shown, each of the nodes includes four CPU cores, and a memory node. Node-to-node inter-communication traffic may result in remote latency 220 and/or interconnect contention 222. The memory node may include a memory controller which may result in some memory controller contention 224 and/or memory latency. Each NUMA node may include a shared cache which may result in some cache contention 226.

In some implementations, NUMA-related bottlenecks, such as remote latency and memory access latency, may be reduced or minimized using the NUMA-aware orchestration component 120.

Figure 3:
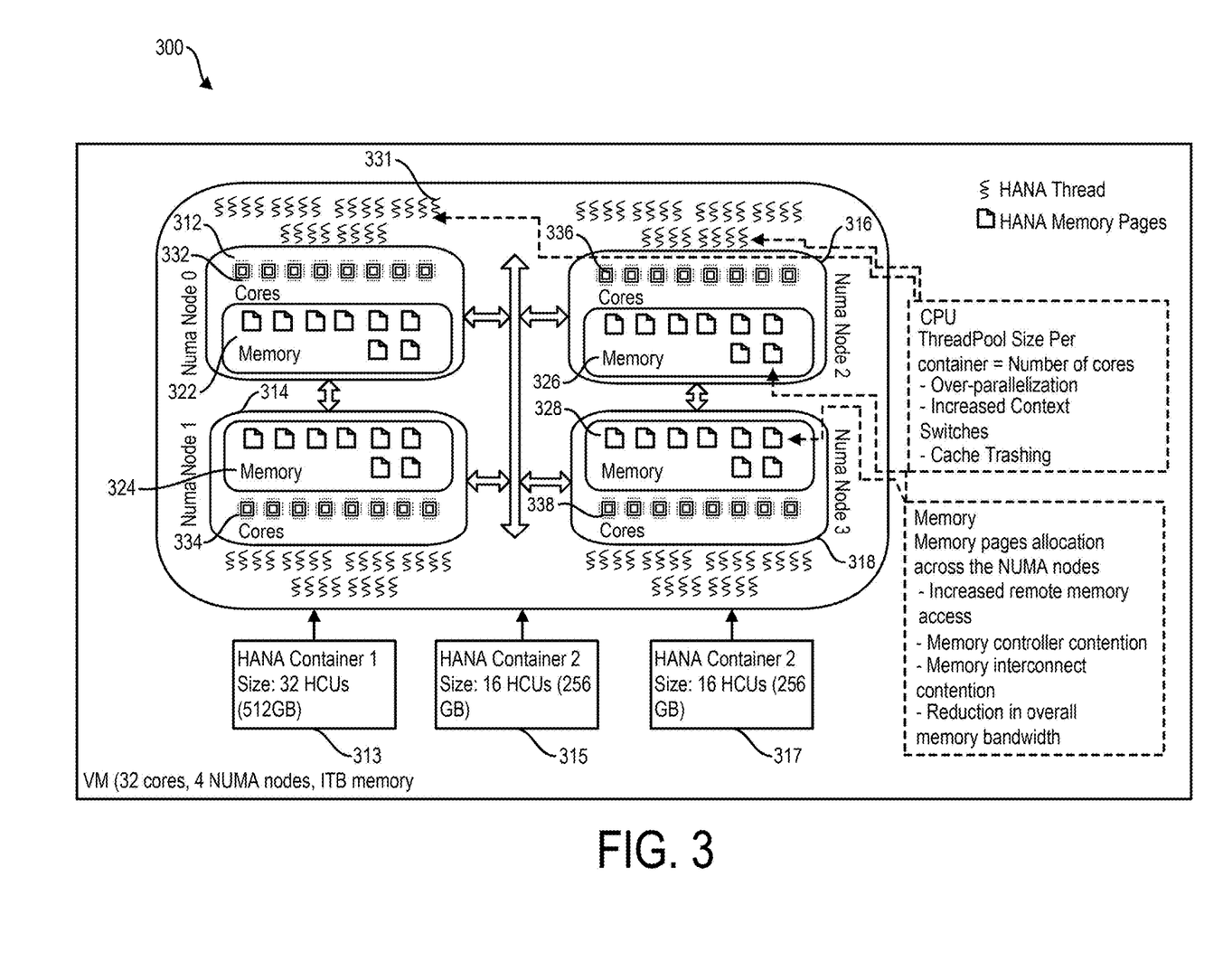
FIG. 3 depicts a block diagram illustrating a database system, in accordance with some example embodiments.

FIG. 3 depicts a block diagram illustrating a database system 300 consistent with implementations of the current subject matter. As shown, the database system 300 includes NUMA nodes 312, 314, 316, and 318, memory pages 322, 324, 326, and 328, and CPU cores 332, 334, 336, and 338. The system 300 further includes database containers 313, 315, and 317.

As shown in the example of FIG. 3, the database containers 313, 315, and 317 have a container size of 512 GB, 256 GB, and 256 GB, respectively. The database containers 313, 315, and 317 may create its own thread pool of 32 active database threads 331, for example. In some aspects, the thread pool size per container may be equal to the number of CPU cores 332, 334, 336, or 338. In the example of FIG. 3, the total number of active threads is 96 (e.g., 32 per container). As shown, the system 300 includes 32 total database threads 331. This over-parallelization may severely affect performance. When there are more active threads than available hardware contexts, the operating system may need to balance the usage of hardware contexts among a higher number of threads. This may result in a large number of context switches. These context switches may be a costly operation, as the currently running thread may be suspended and its execution details may be saved. And, the new thread may be resumed. While a thread is working, the thread may bring data to caches for re-use. When a context switch occurs, a possibly unrelated thread may take up the CPU resources and may bring other data to the caches the unrelated thread needs to use. Thus, this over-parallelization may result in contention among multiple threads for caches.

In addition to thread-level contention, uncontrolled memory allocation may also prove effective performance of the system 300. Just like CPU resources, database containers may see all NUMA nodes available on the system 300. A single database system may be NUMA-aware, where it tries to maximize local accesses by placing a table on a single NUMA node (e.g., nodes 312, 314, 316, and 318). This NUMA-awareness of a database system may still run into some limitations when multiple containers (e.g., containers 313, 315, and 317) are running on the system 300.

For example, containers 315 and 317 of size 256 GB may be completely placed on a single NUMA node, memory requested by this container can be given from a single node and it's all threads can also be affinitized to the CPU cores of this NUMA node. This may ensure all memory accesses are local providing the best performance.

In the lack of control on memory placement, all 3 containers 313, 315, and 317 may place memory pages (322, 324, 326, 328) across all 4 NUMA nodes 312, 314, 316, and 318, on the system 300. This may result into multiple performance issues associated with large systems like increased remote memory access and latency (e.g., remote latency 220), cache contention (e.g., cache contention 226), contention at the memory controller (e.g., memory controller contention 224), and the contention at the memory interconnect reducing overall memory bandwidth.

According to some example embodiments, the orchestration component 120 may maintain an inventory of VMs 110 on which the orchestration component 120 may create, update, migrate, destroy containers 112. A complexity involved with the orchestration is that the underlying hardware of the VMs is abstracted and unknown. As such, the NUMA topology of VMs 110 exposed to the user (e.g., via orchestration component 120) may differ from the NUMA topology of the physical machine from which a VM 110 is carved out. If the orchestration component 120 has a better understanding of the underlying hardware, such as memory latency, bandwidth between the NUMA nodes, the orchestration component 120 may make a better decisions on the placement of containers 112.

To solve the performance issues mentioned above, the orchestration component 120 may be configured to affinitize containers 112 to specific CPU cores (e.g., cores 332, 334, 336, and 338) and memory NUMA nodes (e.g., memory 322, 324, 326, and 328). The orchestration component 120 may be configured to place containers (e.g., containers 313, 315, and 317) on specific CPU and NUMA nodes (e.g., nodes 312, 314, 316, and 318). The database system 300 server may be elastic in the virtualized environment (e.g., processes running inside the container(s) 112 may dynamically adapt to the CPU core and NUMA nodes resource limits applied to it through a container 112). This may provide a unique solution to fix at least some of the performance issues with multiple containers running on a system.

In some implementations, the orchestration component 120 container placement solution may make use of the database system elasticity to optimize the overall performance.

The database system 300 may be run in a virtualized environment in a cloud (e.g., cloud infrastructure 105 and/or cloud platform 102) in which CPU and Memory resources given to the database system may change dynamically. The database system kernel component (which may handle thread and memory management) may adapt to these resource changes. Any changes made in CPU and memory allocations to the database system process through container(s) 112 or control groups may be reflected immediately to the database system servers thread and memory manager, without server restart (e.g., little or no downtime).

To implement elasticity, the database system server internally may maintain its own machine topology data structures. This machine topology may store the CPUs and NUMA node visible to the database system server. In a non-virtualized environment, machine topology stored by the database system may be the same topology of the system it is running on. When CPU and memory resource limits may be applied on the database system server processes using a container or control group, this may be reflected in /proc/<server process id>/status file of the server. The database server may use this file to initiate the database system machine topology structure at startup, and may continuously poll this file for any changes to dynamically change the machine topology structures. These data structures may be used by the thread manager to dynamically control the size of the thread pool and the memory manager to track memory availability per NUMA node for memory allocation.

Figure 4A:
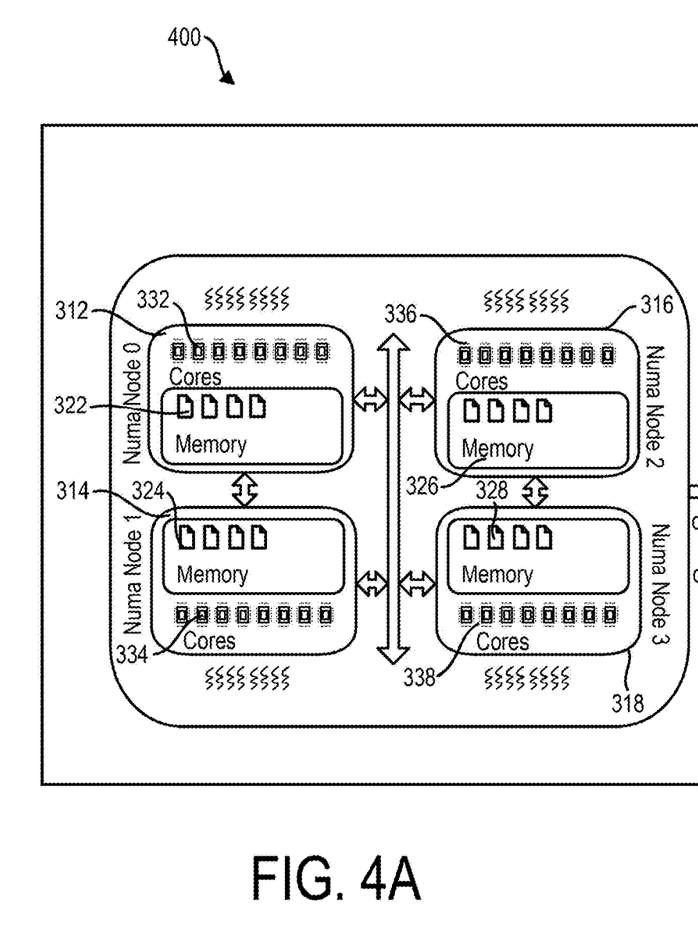
FIGS. 4A-4B depicts a block diagram illustrating example database systems, in accordance with some example embodiments.
Figure 4B:
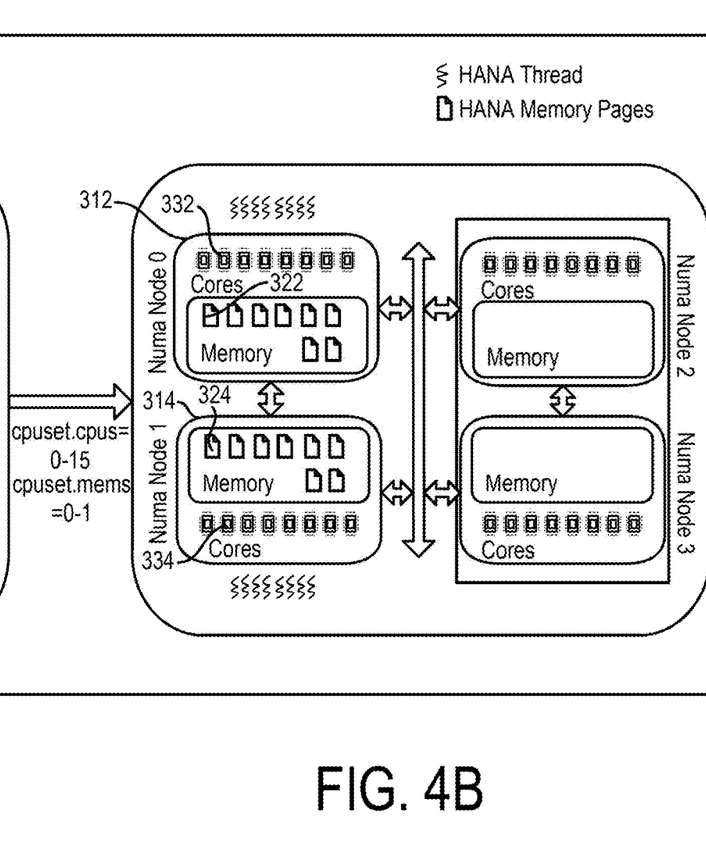

FIG. 4A-4B depicts a block diagram illustrating a database system 400 and 450, respectively, in accordance with some example embodiments. FIG. 4A illustrates the database system server running on a 4 NUMA node system without any resource restriction. Using the docker container resource limit feature, this database server may be limited to run only on the first two NUMA nodes. FIG. 4B illustrates the database system server enforcing resource limits and allocating CPU and memory on nodes 312 and 314. As shown, upon this dynamic change in resource limits, the database system server may automatically shrinks its thread size from 32 thread to 16 to reflect changes in a CPU limitation and may place all its memory only on Nodes 312 and 314.

The orchestration component 120 may use a memory resource limit feature to limit memory usage by a container 112. The orchestration component 120 may also use the following resource limits for determining container placement: cpuset-cpus, (which controls exactly on which CPUs threads are placed for the processes running inside a container 112). An operating system scheduler may ensure that threads are not scheduled for execution outside this CPU list; and the parameter cpuset-mems, controls exactly on which NUMA nodes memory is allocated for the processes running inside a container 112. An operating system may enforce that allocated memory comes only from these nodes even if the process can request for memory allocation from other nodes, not in the cpuset-mems list.

Figure 5:
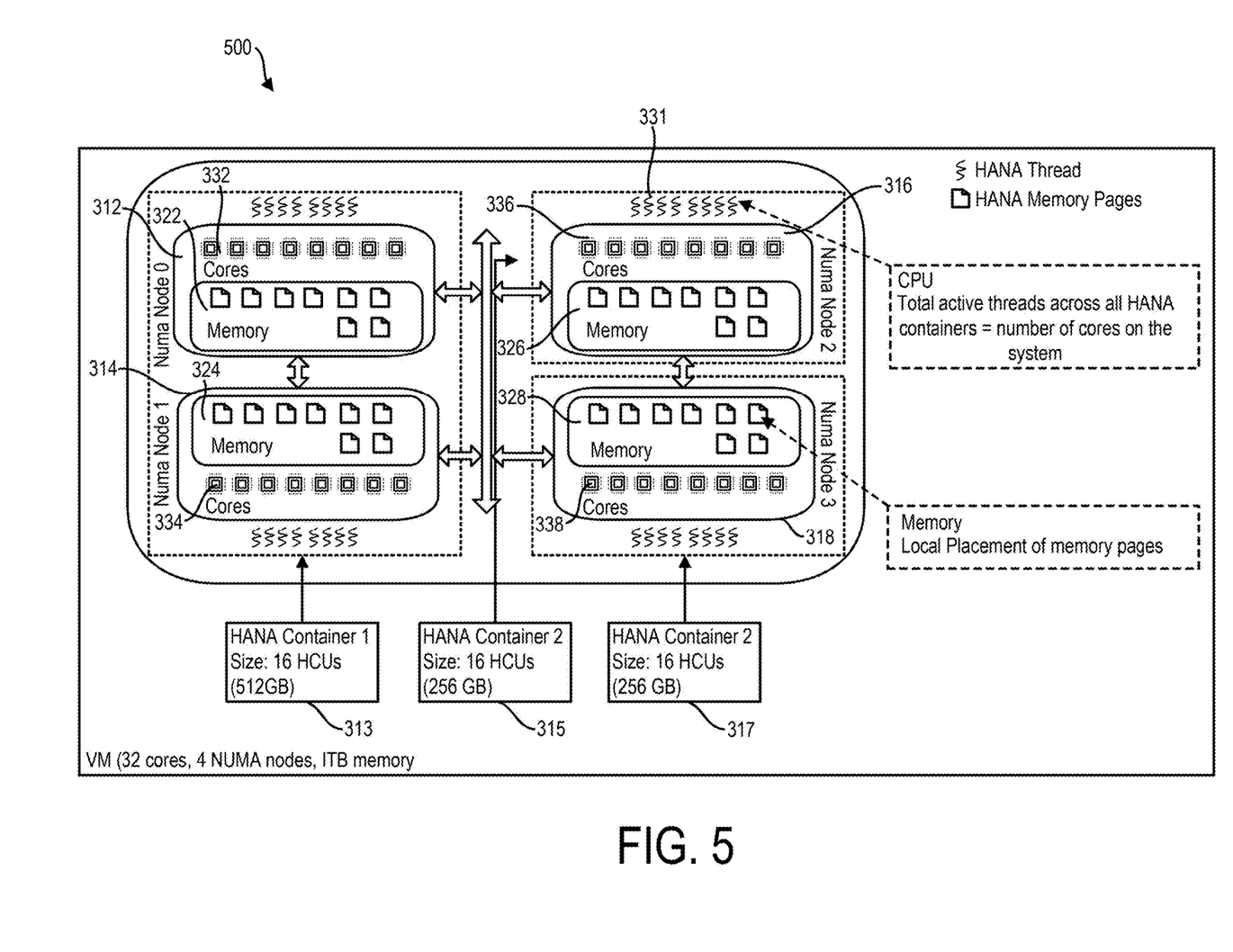
FIG. 5 depicts a block diagram illustrating a database system, in accordance with some example embodiments.

FIG. 5 illustrates a system 500 implementing container 112 placement using resource limit features and combining it with the database system elasticity feature to avoid the performance problems explained with respect to FIG. 2. As shown in the example of FIG. 5, the orchestration component 120 may create the containers 313, 315, and 317 with the following resource limits: container 313 may have a memory size of 512 GB, CPU cores 332 and 334 (e.g., cpuset-cpus=0-15), and memories 322 and 324 (e.g., cpuset-mems=0-1); container 315 may have a memory size of 256 GB, CPU cores 336 (e.g., cpuset-cpus=16-23), and memory 326 (e.g., cpuset-mems=2); and container 317 may have a memory size of 256 GB, CPU cores 338 (e.g., cpuset-cpus=24-31), and memory 328 (e.g., cpuset-mems=3).

With the additional resource limits, the elastic containers 112 may create the thread pool of size equal to the CPUs allocated. CPU cores (e.g., cores 332, 334, 336, and 338) may be allocated to the proportion of the size of the database instance requested. This may ensure total active threads on the database system remains equal to the number of CPU cores. As shown, for container 313, all memory allocations come only from NUMA nodes 312 and 314. Since these two nodes are neighbors (1 hop memory access), this may reduce the remote memory access latency. Container 315 and container 317 may fit completely inside a single NUMA node (e.g, nodes 316 and 318, respectively). This may eliminate neighbor/remote memory accesses solving the memory contention issues.

In some aspects, the abstraction of underlying topology when a VM 110 is provided by the cloud infrastructure 105. To get a better understanding of the topology, the orchestration component 120 may make use of the database system's internal memory benchmarking tool (e.g., NUMAPerf.). The orchestration component 120 may deploy a NUMAPerf container (e.g. container 112) every time a new VM 110 is provisioned in the landscape. This memory tool may capture additional information in addition to the NUMA topology like memory latency and bandwidth between the NUMA nodes in the system. This additional information may assist the orchestration component 120 in getting a better idea of the underlying hardware of the system. During placement of the containers 112, the orchestration component 120 may query resource availability and bandwidth information between the NUMA nodes for the VMs 110 to identify the best suitable VM 110 for the placement of the container 112.

To find out exactly which CPU, NUMA node resources to assign to containers 112, the orchestration component 120 may maintain some additional metadata about each VM 110 present in the inventory. This information may be stored in a store such as a key value store, provided by the cloud infrastructure 105 provider. This metadata may include NUMA topology (which represents the number of NUMA nodes), CPU core indexes per NUMA node, memory size per node, a list of neighbor NUMA nodes, a list of remote NUMA nodes, memory bandwidth (MB/sec): local, neighbor, and/or remote per NUMA node; HANA cloud units (HCU) to resource mapping (which represents the total HANA cloud units per VM such as VM memory size/16 GB). Each HANA cloud unit may be mapped to specific CPU cores and a NUMA node. This information may be used to calculate cpuset.cpus and cpuset.mems resource limits for the requested container; the VM usage (which may represent the accounting information to track the number of containers (e.g., containers 112) hosted on the VM and available HANA cloud units on the VM). This information may be updated continuously as containers 112 are created, deleted, updated on the VM.

Figure 6:
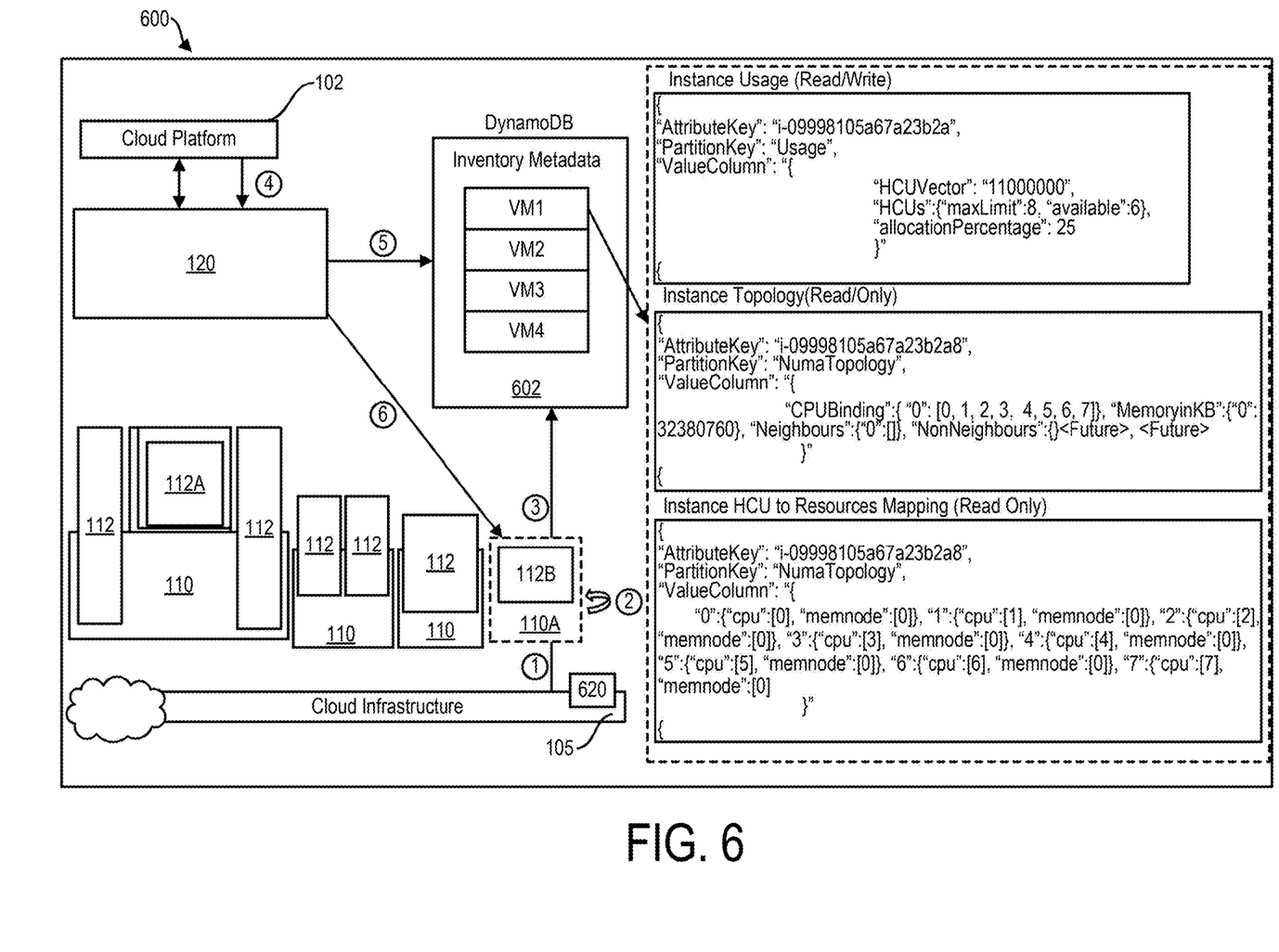
FIG. 6 depicts an example database container placement system, in accordance with some example embodiments.

FIG. 6 describes the detailed operations of database container placement system 600 using the orchestration component 120.

As shown at 1, if the orchestration component 120 is running out of capacity (e.g., memory space) to host containers 112, the orchestration component 120 may request for provisioning of a new VM 110 from cloud infrastructure 105. The database system landscape management 620 may provision a new VM 110 (e.g., VM 110A in FIG. 6).

At 2, upon provisioning of a new VM 110, a container 112 (e.g., container 112B of FIG. 6) of database system's internal memory benchmarking tool (e.g., NUMAPerf) data may be deployed on the VM 110A. The container 112B may be a lightweight container running benchmarking tests to collect VM NUMA topology, memory latency, and bandwidth data for the system. Overall, the benchmarking test run duration may be around 30 seconds, although other durations may be realized as well.

At 3 in the example of FIG. 6, metadata collected by the benchmarking tool (e.g., NUMAPerf) may be stored in inventory metadata stored in a persistent data store, such as a key value store (e.g., DynamoDB 602). This metadata may be used by the orchestration component 120 for placement of containers 112. In some aspects, 1-3 above may be performed only once when a new VM 110 is provisioned, although they may also be performed under different circumstances.

At 4, an end-user may request, at cloud platform 102, for creation of a new database service providing a requirement such as a size of a database, a size of a database container 112, a requirement of high availability node, and the like.

At 5, the orchestration component 120 may query inventory metadata from the database 602 to find out the best VM 110 available for the placement of the requested container 112. The orchestration component 120 may apply multiple rules for finding an optimal VM for the container 112 placement. The rules may include the availability of resources, placing the container 112 on a single NUMA node, placing the container 112 on NUMA node neighbors, bandwidth between the NUMA nodes, or the like.

At step 6, once a particular VM 110 is identified, the container 112B may be deployed on the VM 110A along with the cpuset.cpus and cpuset.mems resource list created for the placement of container 112B on specific CPUs and NUMA node(s).

The orchestration component 120 may also handle other operations like container deletion, upgrade, scale-up/scale-down resources and container migration, or the like.

In an example implementation, a setup with sixteen containers (e.g., containers 112) may run on a VM 110. Containers 112 may be created with different sizes (e.g., 4 containers of size 32 GB, 64 GB, 128 GB, 256 GB, respectively) and may be created on a virtual machine 110 with 2 TB memory and 128 CPU cores. Each container 112 may run benchmark processes. To create more contention on the system, analytical clients may run other benchmark processes on the large size containers.

The number of benchmark processes completed on each container 112 may be compared for performance evaluation. A performance baseline may be set using an orchestration design that creates containers 112 without specific CPU and NUMA node affinity. This may be compared against the design of the orchestration component 120 container placement described herein. With container placement, the cumulative number of benchmark processes completed on all database containers 112 increased by six-fold. The total number of context switches on the system during test execution reduced by 59%. Since all containers 112 were small enough to be placed completely on a single NUMA node, the orchestration component 120 container placement design eliminated remote memory accesses.

Figure 7:
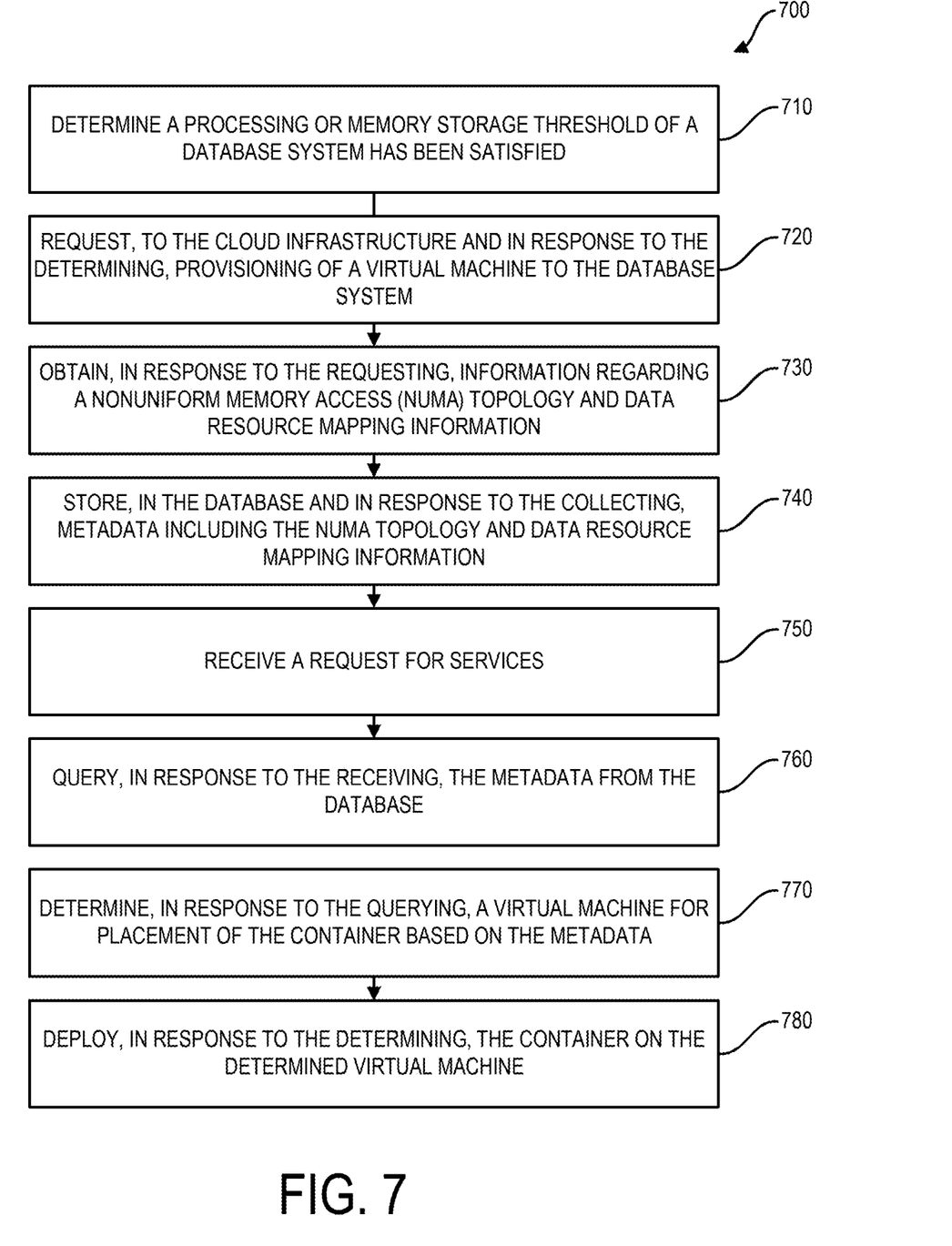
FIG. 7 depicts a flowchart illustrating a process for allocating resources to database containers and placement of the database containers in a database system, in accordance with some example embodiments.

FIG. 7 depicts a process 700 for allocating resources to database containers and placement of the database containers. Referring to FIGS. 1-6, the process 700 may be performed by a computing apparatus such as, for example, the orchestration component 120, the database system landscape management 620, a server, and/or the like.

At operational block 710, the orchestration component 120 may determine a processing or memory storage threshold of a database system has been satisfied. In some aspects, the processing or memory storage threshold may include a threshold processing speed of the database system, a memory size, a quantity or utilization of processing units, or the like.

At operational block 720, the orchestration component 120 may request, to a cloud infrastructure (e.g., cloud infrastructure 105) and in response to the determining, provisioning of a virtual machine (e.g., VM 110) to the database system. For example and with reference to FIG. 6, the orchestration component 120 may request for provisioning of a new virtual machine 110 from the cloud infrastructure 105 and a database system landscape management component 620 may provision the new virtual machine 110.

At operational block 730, the orchestration component 120 may obtain, in response to the requesting, information regarding NUMA topology and data resource mapping information. In some implementations, the information regarding the NUMA topology and the database system performance includes a total number of HANA cloud units (HCU) per virtual machine (e.g., VM 110). The information regarding the NUMA topology and the database system performance may also include a number of NUMA nodes, a list of CPU core indexes per NUMA node, a memory size per NUMA node, a list of neighbor NUMA nodes, a list of remote NUMA nodes, a memory bandwidth, or the like.

At operational block 740, the orchestration component 120 may store, in a database and in response to the collecting, metadata including the NUMA topology and data resource mapping information. In some aspects, the database may include an inventory metadata database. The metadata may include NUMA topology, a cloud unit to resource mapping, and a virtual machine usage.

At operational block 750, the orchestration component 120 may receive a request for services. The request may include a requirement of a container. In some aspects, the requirement may include a memory size of the container.

At operational block 760, the orchestration component 120 may query, in response to the receiving, the metadata from the database. For example and with reference to FIG. 6, the orchestration component 120 may query the metadata from the database DynamoDB 602.

At operational block 770, the orchestration component 120 may determine, in response to the querying, a virtual machine for placement of the container (e.g., container 112, 313, 315, or 317) based on the metadata. In some aspects, the determining may include determining specific CPU resources (e.g., CPU cores 332, 334, 336, and 338) and NUMA nodes (e.g., nodes 312, 314, 316, and 318) for the container 112.

At operational block 780, the orchestration component 120 may deploy, in response to the determining, the container on the determined virtual machine. In some implementations, the deploying may include deploying the container on the determined CPU resources and NUMA node(s).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   determining, by a cloud orchestrator, a processing threshold and/or a memory storage threshold of a database system has been satisfied, the database system comprised in a cloud infrastructure including a plurality of virtual machines and a plurality of containers deployed on the plurality of virtual machines, the database system including a Non-Uniform Memory Access (NUMA) topology that provides the plurality of virtual machines hosting the plurality of containers;
   in response to the determining the processing threshold and/or the memory storage threshold has been satisfied, requesting, by the cloud orchestrator and to the cloud infrastructure, provisioning of a virtual machine to the database system;
   in response to provisioning of the virtual machine, deploying a first container to the virtual machine, the first container running at least one benchmark test to collect at least information regarding the NUMA topology, a memory size of a local memory of a NUMA node, and a memory latency between the NUMA node and a remote memory at a neighboring NUMA node;
   obtaining, by the cloud orchestrator and from the first container running at least one benchmark test, the information regarding the NUMA topology, the memory size of the local memory of the NUMA node, the memory latency between the NUMA node and the remote memory at the neighboring NUMA node, and a performance of at least one database instance of the database system;
   storing, by the cloud orchestrator, the information obtained by the cloud orchestrator;
   in response to receiving a request for a second container, querying, by the cloud orchestrator, the stored information to obtain at least the NUMA topology, the memory size of the local memory of the NUMA node, the memory latency between the NUMA node and the remote memory at the neighboring NUMA node, and the performance of at least one database instance of the database system;
   determining, using at least the memory size and the memory latency, at least one virtual machine and at least one NUMA node for placement of the second container comprising the at least one database instance; and
   deploying the second container on the determined at least one virtual machine and the determined at least one NUMA node.

2. The system of claim 1, wherein the operations further comprise:
   storing, in response to the obtaining, metadata comprising database resource mapping information; and
   receiving the request for the second container, the request comprising a requirement of the second container.

3. The system of claim 2, wherein the metadata comprises a database cloud unit to resource mapping, and the performance indicates at least a virtual machine usage.

4. The system of claim 2, wherein the requirement of the second container comprises a memory size of the second container.

5. The system of claim 1, wherein the NUMA topology comprises one or more NUMA nodes, the one or more NUMA nodes comprising a central processing unit (CPU) core and at least one memory page.

6. The system of claim 5, wherein the information further comprises a total number of database instances per virtual machine.

7. The system of claim 6, wherein each database instance is mapped to specific CPU cores and a specific NUMA node.

8. The system of claim 5, wherein the information further comprises a number of NUMA nodes, CPU core indexes per NUMA node, a memory size per NUMA node, a list of neighbor NUMA nodes, a list of remote NUMA nodes, and a memory bandwidth.

9. The system of claim 1, wherein the information further comprises a number of containers hosted on the plurality of virtual machines.

10. The system of claim 1, wherein in response to the provisioning of the virtual machine to the database system, the first container that runs the at least one benchmarking test is deployed to the at least one of the plurality of virtual machines.

11. The system of claim 1, wherein the deploying of the second container further comprises using at least the memory latency to deploy the second container to a single NUMA node to reduce remote memory access latency between the single NUMA node and the remote memory at the neighboring NUMA node.

12. The system of claim 1, wherein the deploying of the second container further comprises using at least the memory latency to deploy the second container to the NUMA node and the neighboring NUMA node.

13. A computer-implemented method, comprising:
  determining, by a cloud orchestrator, a processing threshold and/or a memory storage threshold of a database system has been satisfied, the database system comprised in a cloud infrastructure including a plurality of virtual machines and a plurality of containers deployed on the plurality of virtual machines, the database system including a Non-Uniform Memory Access (NUMA) topology that provides the plurality of virtual machines hosting the plurality of containers;
  in response to the determining the processing threshold and/or the memory storage threshold has been satisfied, requesting, by the cloud orchestrator and to the cloud infrastructure, provisioning of a virtual machine to the database system;
  in response to provisioning of the virtual machine, deploying a first container to the virtual machine, the first container running at least one benchmark test to collect at least information regarding the NUMA topology, a memory size of a local memory of a NUMA node, and a memory latency between the NUMA node and a remote memory at a neighboring NUMA node;
  obtaining, by the cloud orchestrator and from the first container running at least one benchmark test, the information regarding the NUMA topology, the memory size of the local memory of the NUMA node, the memory latency between the NUMA node and the remote memory at the neighboring NUMA node, and a performance of at least one database instance of the database system;
  storing, by the cloud orchestrator, the information obtained by the cloud orchestrator;
  in response to receiving a request for a second container, querying, by the cloud orchestrator, the stored information to obtain at least the NUMA topology, the memory size of the local memory of the NUMA node, the memory latency between the NUMA node and the remote memory at the neighboring NUMA node, and the performance of at least one database instance of the database system;
  determining, using at least the memory size and the memory latency, at least one virtual machine and at least one NUMA node for placement of the second container comprising the at least one database instance; and
  deploying the second container on the determined at least one virtual machine and the determined at least one NUMA node.

14. The method of claim 13, wherein in response to the provisioning of the virtual machine to the database system, the first container that runs the at least one benchmarking test is deployed to the at least one of the plurality of virtual machines.

15. A non-transitory computer readable medium storing instructions, which when executed by at least one data processor, result in operations comprising:
  determining, by a cloud orchestrator, a processing threshold and/or a memory storage threshold of a database system has been satisfied, the database system comprised in a cloud infrastructure including a plurality of virtual machines and a plurality of containers deployed on the plurality of virtual machines, the database system including a Non-Uniform Memory Access (NUMA) topology that provides the plurality of virtual machines hosting the plurality of containers;
  in response to the determining the processing threshold and/or the memory storage threshold has been satisfied, requesting, by the cloud orchestrator and to the cloud infrastructure, provisioning of a virtual machine to the database system;
  in response to provisioning of the virtual machine, deploying a first container to the virtual machine, the first container running at least one benchmark test to collect at least information regarding the NUMA topology, a memory size of a local memory of a NUMA node, and a memory latency between the NUMA node and a remote memory at a neighboring NUMA node;
  obtaining, by the cloud orchestrator and from the first container running at least one benchmark test, the information regarding the NUMA topology, the memory size of the local memory of the NUMA node, the memory latency between the NUMA node and the remote memory at the neighboring NUMA node, and a performance of at least one database instance of the database system;
  storing, by the cloud orchestrator, the information obtained by the cloud orchestrator;
  in response to receiving a request for a second container, querying, by the cloud orchestrator, the stored information to obtain at least the NUMA topology, the memory size of the local memory of the NUMA node, the memory latency between the NUMA node and the remote memory at the neighboring NUMA node, and the performance of at least one database instance of the database system;
  determining, using at least them memory size and the memory latency, at least one virtual machine and at least one NUMA node for placement of the second container comprising the at least one database instance; and
  deploying the second container on the determined at least one virtual machine and the determined at least one NUMA node.

* * * * *